United States Patent [19]

Cox

[11] Patent Number: 5,432,025
[45] Date of Patent: Jul. 11, 1995

[54] BATTERY CAP

[76] Inventor: Lamar Cox, 7327 14th St., NW., Washington, D.C. 20012

[21] Appl. No.: 141,940

[22] Filed: Oct. 28, 1993

[51] Int. Cl.⁶ .............................................. H01M 2/32
[52] U.S. Cl. ......................................... 429/65; 429/121
[58] Field of Search .................. 429/65, 121; 439/274, 439/275, 750, 754

[56] References Cited

U.S. PATENT DOCUMENTS

| | | | |
|---|---|---|---|
| 3,956,576 | 5/1976 | Jensen et al. | 429/65 |
| 4,372,636 | 2/1983 | DuFresne | 439/754 |
| 5,021,305 | 6/1991 | Turner | 429/65 |

*Primary Examiner*—Stephen Kalafut
*Attorney, Agent, or Firm*—Chenpatents

[57] ABSTRACT

A battery cap to be pressed onto the battery terminal and battery clamp of an automobile when acid corrosion on the terminal and clamp has interrupted electrical contact due to the buildup of corrosion products, to restore electrical conduction. Within the cap there is an electrically-conducting metal wire pad adhering to its top which makes electrical contact with the battery terminal post and the battery clamp. Optionally, a wire brush may be mounted on the cap to enable the user to brush corrosion products from the battery post and clamp before placement of the cap thereon.

7 Claims, 2 Drawing Sheets

BATTERY CAP

BACKGROUND OF THE INVENTION

1. Field of Invention

This invention relates to a battery terminal cap, and more particularly to a cap for restoring a battery connection to enable the flow of current to start the engine of an automobile.

2. Prior Art

In the prior art, there are provided many articles for protecting battery terminals against acid corrosion while the battery is installed in an automobile.

U.S. Pat. No. 4,698,459 relates to a case for protecting the electrical connection of a battery between its terminal post and the clamp connector which joins a cable to the post. The case houses the post and its connecting clamp including the nut and bolt of the clamp.

U.S. Pat. No. 5,021,305 discloses a cover which seals the terminal post and its clamping nut and bolt with a top and bottom case including sealers for the post and the cable.

U.S. Pat. No. 3,607,442 relates to the use of a sheet of metal higher in the electromotive series than the metal of the battery post as protection against acid attack.

The cases and covers of the prior art for the protection of battery terminals against acid corrosion are relatively costly and cumbersome to install. Removal of the clamps from the battery terminals, cleaning of the clamps and terminals, and replacement of the clamps on the terminals is not generally practical on the road. Most motorists do not carry appropriate wrenches and wire brushes in their automobiles to perform such tasks.

The present invention seeks to provide an inexpensive means of starting the engine of an automobile in an emergency. Frequently, the reason an engine does not start is the buildup of acid corrosion products on and between the battery terminals and the battery clamps. Such corrosion products act as electrical insulators; they prevent electrical current from flowing from the battery to the starter motor of the engine. Therefore, there is a need for a battery cap to be used in emergencies as herein described.

The objective of the present invention is to provide a battery cap to cover the battery terminals so as to provide a maximum of electrical contact between the battery terminals and the battery clamps via the exterior surface thereof. This exterior surface is not utilized for electrical conduction in devices known to the art. In addition, a metal wire brush may be provided on top of the cap to facilitate brushing off of deposits of corrosion products on the battery terminal post and clamp before installing the cap. Another object is to provide a simple, easy-to-use and economical device to restore electrical contact between battery terminals and the electrical system of an automobile. These and other objects will be readily evident from study of the following specification and the accompanying drawings.

SUMMARY OF THE INVENTION

The battery cap of this invention is of generally cylindrical shape. The cap has a flat top and connected to the top, there is provided a cylindrical wall of sufficient circumference and depth to contain a battery clamp. Inside the cap, adjacent to the top of the cap, there is provided an electrically-conductive fine metal wire pad or mesh, herein referred to as wire mesh. When the cap is pressed on a corroded battery clamp, the wire mesh conforms to the shape of the exterior surfaces of the clamp and battery terminal. As the wire mesh comes in contact with the surfaces of the terminal and clamp, deposits due to corrosion are wiped off these surfaces due to the abrasiveness of the wire mesh, and electrical contact is made with the battery terminal post and clamp. This restores sufficient electrical conductance between the battery and the electrical system of the automobile to allow starting of the engine.

DESCRIPTION OF PREFERRED EMBODIMENT

Figure 1:
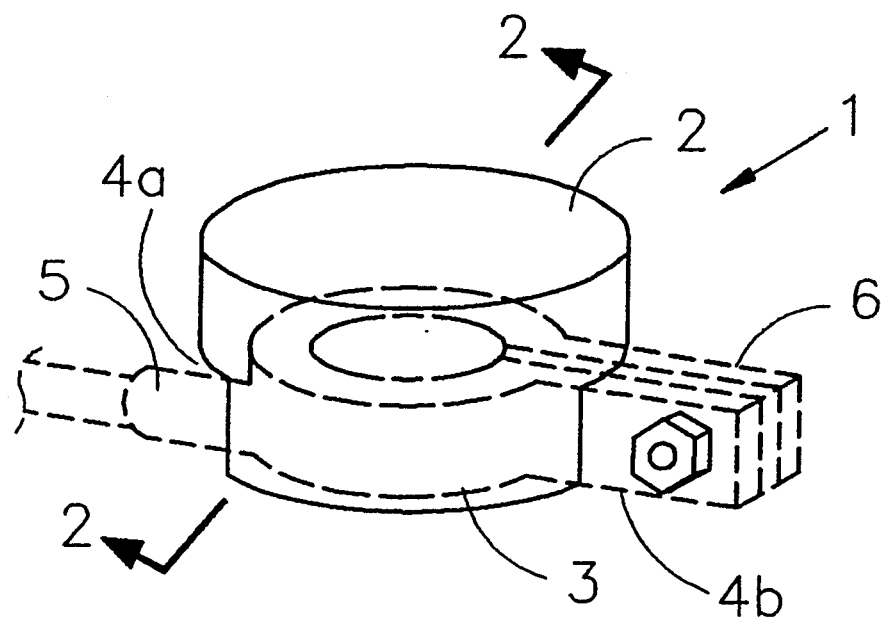
FIG. 1 is a perspective view of the cap in accordance with the invention.

With reference to FIG. 1, a battery cap 1 has a flat top 2 of generally circular shape and a cylindrical wall 3. The wall 3 has two opposing openings 4a and 4b to accommodate the cable connector 5 in one and the arms of the battery clamp 6, in the other. The cap may have only one opening for the cable connector 5 when the cap is of sufficient size to contain the entire clamp end. In the latter case, the cap would be oval shape (not shown). The cap may be made of metal or flexible plastic such that its resilence exerts pressure against the clamp, holding the cap in place. The top of the cap covers the battery terminal post and the battery clamp. Alternatively, the top may cover the post, clamp connector and the clamp arms depending on the design of the battery clamp connector. The battery cap of the present invention is not limited to any particular battery clamp design.

Figure 2:
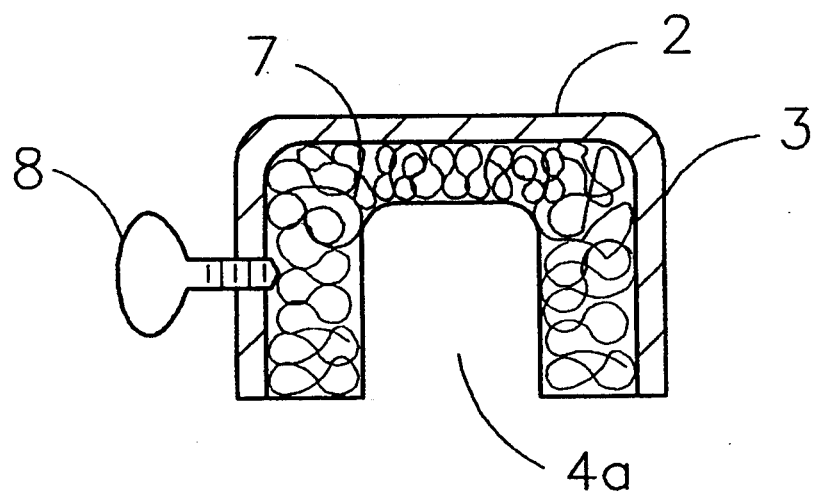
FIG. 2 is a cross section of the cap.

The cylindrical wall 3 is integrally and perpendicularly fixed to the top 2. On the underside of the top of the cap, there is attached an electrically conductive, flexible, fine metal wire mesh 7 as shown in FIG. 2. The wire mesh should have sufficient bulk so as to extend downardly along the cylindrical wall 3. The wire mesh is made of a metal or metal alloy having high electrical conductivity, e.g. copper, brass, aluminum, or stainless steel, and the wires may be woven into a mesh or wire cloth or pad. The mesh makes electrical contact with the battery post and clamp over a considerable area, thereby creating a low-resistance electrical path between the battery post and clamp. The flexibility of the wire mesh enables it to conform to any irregularities in the shape of the battery post and clamp.

In another embodiment, the metal cap is provided with at least one set screw 8 as shown in FIG. 2. It is threaded into a drilled and tapped hole in the wall 3 and tightened to prevent the cap from slipping off the battery clamp. Alternatively, two or more set screws may be provided. The screws may have tabs for hand-tightening, slotted heads for tightening with a screw driver, or any other configuration known to the art.

Figure 3:
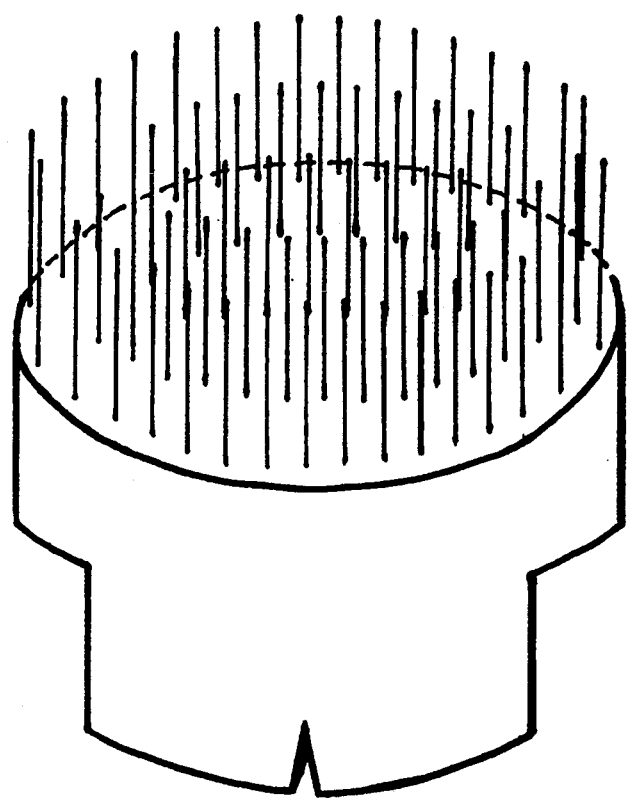
FIG. 3 is a perspective view of an embodiment of the cap in accordance with the invention.

In yet another embodiment, not illustrated, the cap is made from metal and the wall is made of a plurality of leaf springs, 10, as shown in FIG. 3 which grasp the battery clamp.

For convenience, a wire brush, 9, as shown in FIG. 3 may be attached to the top of the cap for brushing corrosion product off the battery terminal post and clamp before placement of the cap on the battery connection.

In a test of the efficiency of the battery cap of this invention in a 1985 Lincoln, one of the battery clamps was disconnected from the battery terminal post, a piece of plastic sheet was wrapped around the post, and the battery clamp was replaced. The plastic sheet mimicked the electrical insulating properties of a thick layer of corrosion products. Obviously, the engine of the automobile could not be started with this insulating layer in place. When the battery cap of this invention was pressed on the terminal and clamp, the engine of the automobile could be started, demonstrating that adequate electrical contact was restored by the use of the battery cap.

Numerous modifications and variations of the present invention are possible in light of the above teaching. Therefore, within the scope of the appended claims, the invention may be practiced otherwise than as particularly described.

I claim:

1. A battery cap to be placed on an acid-corroded battery terminal post and battery clamp of an automobile comprising a top having a shape selected from the group consisting of circular shape and oval shape and a cylindrical wall perpendicularly affixed to the top and having at least one opening to accomodate a battery cable connected to a battery clamp, and an electrically-conductive metal wire mesh affixed to the underside of the cap, making electrical contact with the battery terminal post and the battery clamp when the cap is placed thereon.

2. The battery cap of claim 1 further comprising a wire brush fastened to the top of the cap for brushing off corrosion deposit on the battery terminal post and clamp.

3. The battery cap of claim 1 wherein the wall is made of flexible plastic.

4. The battery cap of claim 1 wherein the wall is made of metal and a set screw is provided on the wall for tightening the cap.

5. The battery cap of claim 1 wherein the wall is made of a plurality of metal leaf springs which grasp the battery terminal post and clamp.

6. The battery cap of claim 1 wherein the electrically-conductive metal wire mesh is selected from the group consisting of copper, brass, aluminum, and stainless steel.

7. The battery cap of claim 1 further comprising a second opening on the wall to accomodate arms of a battery clamp.

* * * * *